Nov. 17, 1964 W. N. CARROLL 3,157,780

PULSE TRAIN SENSING CIRCUITRY

Filed June 27, 1960

INVENTOR
WILLIAM N. CARROLL
BY Edgar H. Kent
ATTORNEY 3,157,780
PULSE TRAIN SENSING CIRCUITRY
William N. Carroll, Rhinebeck, N.Y., assignor to International Business Machines Corporation, New York, N.Y., a corporation of New York
Filed June 27, 1960, Ser. No. 38,811
3 Claims. (Cl. 235—164)

This invention relates to electronic control circuitry and more particularly to circuitry responsive to a series of pulse signals and especially useful in conjunction with apparatus for performing arithmetical operations in data processing machines of the electronic digital computer type.

In high-speed electronic digital computers the length of time required to perform any given operation directly affects the overall speed of the computer and much attention has been accorded the design of the components utilized therein and the operations of logical combinations thereof to maximize the data handling speed of the overall system. In such systems a series of pulse signals are produced and it is often desirable to know when the pulse signals terminate so that a subsequent operation may be promptly initiated, or for error checking purposes, for example, such circuitry is particularly useful in controlling asynchronous arithmetical operations in digital computers of the type described in Patent No. 3,064,896, issued on November 20, 1962, in the name of William N. Carroll et al. Portions of the circuitry of this invention are utilized in the apparatus described in their application.

In high-speed digital computer operations which incorporated binary multiplication circuitry the multiplication process has been performed in response to system timing pulses resulting in a fixed length instruction. However there are certain steps which are not necessarily performed during each partial product iteration and the lengths of many of the steps involved depend upon characteristics of the specific quantities that are being manipulated. For example the length of time required for each addition step involved in a partial product iteration is dependent uopn the number of carries that are generated. Conventionally the summing circuitry has been designed to insure adequate time for the maximum number of carries whereas the usual number of carries involved in a summation is only a small fraction of that maximum. Accordingly, it is a general object of the invention to provide improved electronic circuitry capable of sensing a serial train of pulse signals, such as carries, and providing a signal indicative of the state thereof.

Another object of this invention is to provide novel circuitry capable of incorporation in improved apparatus for performing binary multiplication in an asynchronous manner.

A more specific object of the invention is to provide electronic circuitry for use in binary system apparatus capable of sensing the completion of each addition operation so that the system is enabled to proceed immediately to the operations subsequent thereto.

In accordance with the preferred embodiment of the invention, hereinafter described in greater detail, there is provided an asynchronous binary multiplication system which, in response to a multiply instruction, initiates a multiplication operation and enables it to proceed to completion as rapidly as possible and independently of the timing control normally provided by the associated computer. This results in an instruction that is of a variable length dependent on the characteristics of the quantities being multiplied.

In this apparatus carry pulses are serially propagated through the stages of the adder circuitry during each partial product iteration. These pulses overlap in time and the circuitry of the invention senses those carry signals and provides an inhibiting level until they terminate. At the termination (indicating the completion of the partial product iteration) the output level changes and this transition is converted into a pulse which is utilized to initiate the next partial product iteration.

This circuitry is also useful in checking the operation of a chain of parity circuits of the type disclosed in Patent No. 3,011,073, issued on November 28, 1961, in the name of J. J. Moyer.

With the use of the reliable high-speed components employed in the preferred embodiment of the system, the circuitry of the invention enables marked overall savings in the length of time required for each multiplication operation.

Other objects and advantages of the invention will be seen as the following description of a preferred embodiment thereof progresses in conjunction with the drawing, in which.

Figures 1, 2, 3:
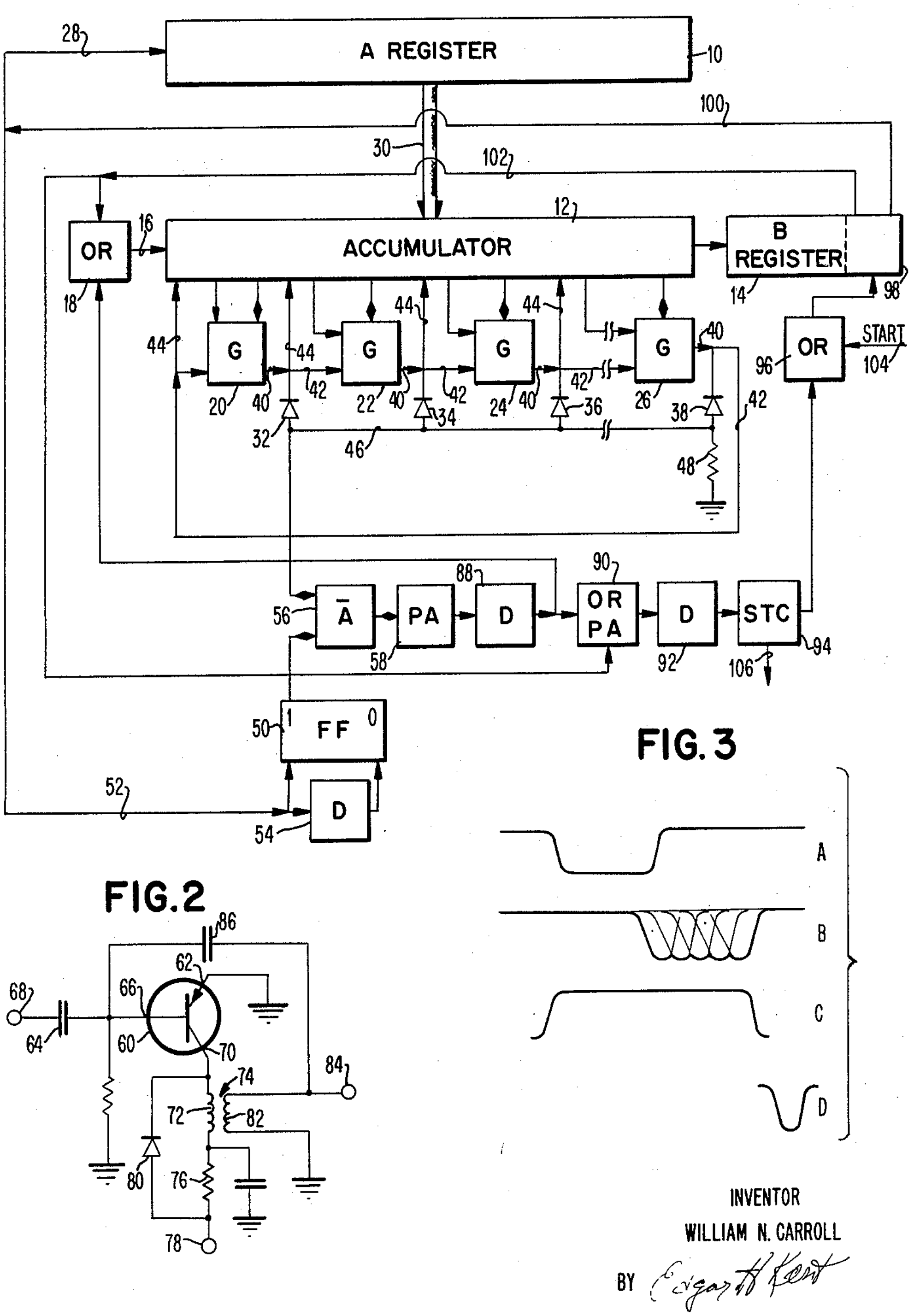
FIG. 1 is a logical block diagram illustrating the adder circuitry and storage registers associated with a binary mulitplication system.
FIG. 2 is a schematic diagram of a pulse amplifier utilized in the preferred embodiment.
FIG. 3 is a set of diagrams indicating various signal relationships of the circuitry of FIG. 1.

In these figures a conventional filled in arrowhead is employed on lines to indicate (1) a circuit connection, (2) energization with a negative pulse, and (3) the direction of pulse travel. A diamond-shaped arrowhead indicates (1) a circuit connection, (2) energization with a D.C. level, and (3) the direction of application of that level. Boldface characters appearing within a block identify the common name of the circuit represented, for example, FF designates a flip-flop, G a gate circuit, OR a logical OR circuit, D a delay line and $\bar{A}$ a logical NOT AND circuit. A variety of circuits suitable for the performance of each of these functions is known in the art. However, the preferred type of components are disclosed in the copending application S.N. 824,119 filed in the name of Carroll A. Andrews et al. on June 30, 1959 and entitled Magnetic Core Transfer Matrix and in Patent No. 3,085,747, issued on April 16, 1963, in the name of C. J. Tilton.

The circuitry illustrated in FIG. 1 is responsive to a Multiply instruction signal and enables the entire multiplication operation to be performed independently of the normal computer timing pulses. Conventionally this signal emanates from a Command Generator in the Instruction Control circuitry of the associated computer. The logical organization of a suitable type of computer in which the apparatus of this invention may be incorporated is disclosed in Patent No. 2,914,248, issued on November 24, 1959, in the name of Harold D. Ross et al. In FIG. 1 there is shown in block form an A Register 10, an Accumulator 12 and a B Register 14, which are adapted to store binary signals representative of the multiplicand, product and multiplier.

In the preferred embodiment the A Register 10, the Accumulator 12 and the B Register 14 each are twenty bit registers and include a sign bit stage and nineteen data bit stages. In order to simplify the drawing only four stages have been shown and these are indicated by the fast carry gates 20, 22, 24, 26, associated with the Accumulator.

The Accumulator 12 and the B Register 14 are susceptible to organization as a single register and there is associated with those registers a series of gates (not shown) which enable the number stored in the combined register to be shifted right one stage when the gates are sampled by a pulse on line 16 by transfer through connected OR circuit 18. Adder circuitry is interposed between the corresponding stages of the A Register and the Accumulator and this circuitry is preferably of the type described in detail in Patent No. 3,042,304, issued on July 3, 1962, in the name of Eddie T. Hall et al.

To perform an addition (a partial product iteration) the bits of value ONE in the number held in the A Register 10 are transferred in response to a pulse on line 28 in a broadside or parallel transfer operation over cable 30 to the complement inputs of flip-flops in the Accumulator 12. Each transferred pulse is also applied through a delay circuit (which allows the Accumulator flip-flops to resolve) and samples a slow carry gate which is conditioned by the ZERO level of the Associated Accumulator flip-flop. If the flip-flop is in the ZERO condition after being complemented (indicating that the ONE transferred from the A Register was added to a ONE stored in the Accumulator and a carry must be generated) the pulse is passed and applied to the complementing input of the flip-flop of the next higher stage and to the associated fast carry gate (20, 22, 24, 26) conditioned by the ONE output of that next higher flip-flop. This fast carry can propagate along the fast carry lines until an Accumulator flip-flop in the ZERO state is reached and it will then stop. As no stage can generate nor pass more than one carry per addition process the maximum duration of the carry propagation is once around the loop. A series of overlapped fast carry pulses are indicated in the center portion of the wave-form in FIG. 3A. Associated with this adder circuitry is a carry completion detection circuit which provides a signal upon the completion of each addition operation. The detection circuit comprises a set of diodes 32, 34, 36, 38 connected together to form a negative OR circuit. One diode is associated with each stage of the adder circuitry with its cathode connected to the output pulse line 40 of the fast carry gate of that stage. (As indicated, the fast carry output line 40 is connected to the fast carry gate of the next higher stage (line 42) and to the complement input of that stage (line 44).) The anodes of the diodes are tied together by line 46 which is connected to ground through a 120 ohm resistor 48.

The carry completion circuitry also includes a flip-flop 50 which is set by the Add pulse applied thereto over line 52 and then is cleared when that pulse is passed by delay circuitry 54. The ONE output level of flip-flop 50 and the output of the OR diode network from line 46 are connected as inputs to a NOT AND circuit 56, a logical circuit that has a down output level only when all its input levels are up. (The output of NOT AND circuit 56 is indicated in FIG. 3B.) When flip-flop 50 is set its ONE output level is down, at approximately —3.5 volts and applies the level "FF" to NOT AND circuit 56 as shown in FIG. 3A. The pulses propagated on the fast carry lines are also at approximately the same voltage. As the duration of a fast carry pulse is approximately four times the length of the time delay in propagation introduced by each fast carry gate the carry pulses applied to the diode OR circuit will overlap and each diode will be turned on successively as the negative pulse passes through the fast carry gates. This produces a substantially constant —3.5 volt output level on line 46 which exists as long as any of the gates pass a carry pulse and is applied to NOT AND circuit 56 as indicated in FIG. 3A.

In operation, the ONE output level of flip-flop 50 remains down until the Accumulator flip-flops have resolved after the half add operation and the generation of fast carries has been initiated. Then the pulse passed by delay unit 54 clears flip-flop 50 so that its ONE output level rises to ground. However, the other input to the NOT AND circuit is down at this time if any carries are generated and it remains down until the fast carry propagation has terminated. As soon as the fast carry propagation does terminate, the voltage on line 46 rises to ground potential, permitting the output level of the NOT AND circuit to fall as indicated in FIG. 3B. When the output level of the NOT AND circuit does fall the resulting transition applied to pulse amplifier 58 is converted to a pulse signal for use in the control circuitry to indicate the completion of the addition operation.

A schematic diagram of the pulse amplifier 58 is shown in FIG. 2. This circuit includes a PNP transistor 60 connected in common emitter configuration with the emitter electrode 62 grounded. Input signals are coupled through capacitor 64 to the base electrode 66. A diode OR circuit may be connected to terminal 68 to provide a desired logical function. The collector electrode 70 is connected to one terminal of the primary winding 72 of a pulse transformer 74. The other terminal of winding 72 is connected to a source of suitable voltage at terminal 78 through resistor 76, and a diode 80 is connected across the series combination of winding 72 and resistor 76. The secondary winding 82 of transformer 74 is connected to the output terminal 84. A capacitor 86 couples the output signal back to the base electrode 66 in a feedback operation. When a negative going transition is applied to terminal 68 the base electrode 66 is driven negatively, turning on the transistor 60 and producing current flow from the collector electrode 70 which induces a voltage in secondary winding 82 for application to output terminal 84, as indicated in FIG. 3C. As the current reaches maximum value the induced voltage decreases and this change is coupled by capacitor 86 to the base electrode 66, turning transistor 60 off. Thus the input level transition has been converted to a pulse output.

The output pulse from pulse amplifier 56 is applied through delay unit 88 (to allow resolution of the Accumulator flip-flops) to OR pulse amplifier 90 and to OR circuit 18 from which, via line 16, it effects a shift of the bits in the Accumulator 12 and B Register 14. From delay unit 88, the pulse is passed through a second delay unit 92 (to allow flip-flop resolution after the shift) and then steps the counter (STC) 94 which controls the number of partial product iterations. The stepping of counter 94 produces a pulse which is applied through OR circuit 96 to sample the least significant stage 98 of the B Register 14. If that stage contains a ONE a signal is supplied on line 100 to lines 28 and 52 to initiate an addition operation but if that stage contains a ZERO a signal is supplied on line 102 to line 16 to shift the contents of the combined Accumulator B Registers, and to OR pulse amplifier 90 to initiate the next sampling pulse (bypassing the carry completion circuitry).

The entire multiplication operation is under the supervision of the Step Time Counter (STC) 94, which is initially set to a count of twenty, the required number of partial product iterations. This counter is stepped at the completion of each partial product iteration in the conventional manner.

The multiplication operation is initiated by a pulse from the Computer Instruction Control on line 104 after the multiplicand and the multiplier have been placed in the A Register 10 and the B Register 14 respectively. The multiplication operation initiating pulse, passed through OR circuit 96, samples the least significant stage 98 of the B Register. If this stage contains ONE a pulse is passed on line 100 to initiate an addition operation. On completion of this addition the carry completion circuitry generates a pulse from pulse amplifier 58 which shifts the combined contents of the Accumulator and B registers, steps the counter 94 and samples the new contents of B Register stage 98. Whenever that stage contains ZERO the addition operation is omitted and only shifting and stepping are performed. When the counter 94 is stepped to ZERO a pulse is generated on line 106 indicating the end of the multiplication operation. At that time the resulting product is stored in the combined Accumulator-B Register.

It will be noted that the control circuitry enables the execution of the partial product iteration at the maximum speed allowed by the components utilized in the storage registers and adder circuitry and operates asynchronously, in complete independence of computer timing signals. A signal generated at the end of each iteration immediately initiates the next, and thus the entire operation may proceed to completion in much shorter time than is possible with a system that is controlled by computer timing pulses. Thus the invention enables the performance of arithmetic operations in an electronic digital computer system much more rapidly than heretofore possible. The entire operation is controlled in an asynchronous manner by a simple control circuitry that operates entirely independently of the associated computer timing apparatus. Each step of the iteration is initiated as soon as the previous step is completed, there being means associated with the various registers for signalling the completion of variable length manipulations of words stored therein. The circuitry can of course be used in other types of systems where detection of the start or termination of a series of pulse signals is desired.

Thus it will be seen that the circuitry of the invention provides a simple and reliable apparatus suitable for supervising a variety of operations, and is particularly useful in digital computer arithmetical operations. Therefore, while a preferred embodiment of the invention has been shown and described herein various modifications thereof will be obvious to those skilled in the art and it will be understood that the invention is not intended to be limited thereto or to details hereof and departures may be made therefrom within the spirit and scope of the invention as defined in the claims.

I claim:

1. In an electronic digital computer, apparatus for performing arithmetic operations comprising first register means having a plurality of stages for storing binary signals representative of a first value, second register means having a corresponding number of stages for storing binary signals representative of a second value, means including an adder having a corresponding number of stages to perform a summing operation on the numbers held in said first and second registers in response to an addition initiating signal, said summing operation producing a serial train of carry pulses overlapping in time, and means to detect at change in said serial train of carry pulses produced during said summing operation comprising a diode corresponding to each stage of said adder, each said diode being connected to the associated adder stage and being poled to pass a signal indicative of the generation of a carry by said adder stage, a common circuit connected to all of said diodes arranged to provide a level output indicative of the generation of a train of carry pulses, means responsive to a transition in the level output provided by said common circuit to produce an output pulse signal indicative of the termination of carry propagation in said adder and delay means responsive to said addition initiating signal for providing an inhibiting signal to said level output response means during the period of initial resolution of said adder stages immediately after the initiation of a summing operation.

2. In an electronic digital computer, apparatus for performing arithmetic operations comprising first register means having a plurality of stages for storing binary signals representative of a first value, second register means having a corresponding number of stages for storing binary signals representative of a second value, means including an adder having a corresponding number of stages to perform a summing operation on the numbers held in said first and second registers and including transfer means associated with each stage of said adder for propagating carry pulses between adjacent stages thereof, said summing operation producing a serial train of carry pulses, overlapping in time, and means to detect a change in said serial train of carry pulses produced during said summing operation comprising an asymmetrically conductive device corresponding to each stage of said adder, each said asymmetrically conductive device being coupled to the corresponding transfer means connected between each pair of adjacent adder stages and being poled to pass a signal indicative of the generation of a carry by the corresponding adder stage, said asymmetrically conductive devices being connected to a common circuit for producing an output level during the propagation of carry pulses by said adder, and signal producing means including a transistor having an input circuit and an output circuit, a transformer having a primary winding and a secondary winding, said primary winding being connected to the output circuit of said transistor, and means to apply said output level to the input circuit of said transistor so that said transistor changes its state of conduction on the termination of said output level and causes a voltage to be induced in the secondary winding of said transformer to generate a signal indicative of the completion of the summing operation at that time.

3. In an electronic digital computer, apparatus for performing arithmetic operations comprising first register means having a plurality of stages for storing binary signals representative of a first value, second register means having a corresponding number of stages for storing binary signals representative of a second value, means including an adder having a corresponding number of stages to perform a summing operation on the numbers held in said first and second registers, each adder stage having a carry gate connected thereto for passing a carry pulse generated by that stage during the summing operation, said summing operation producing a serial train of carry pulses overlapping in time, and means to detect a change in said serial train of carry pulses produced during said summing operation comprising a diode corresponding to each stage of said adder, each said diode having first and second terminals, one of said terminals of each diode being connected to the output of the carry gate of the associated adder stage to sense generated carry pulses and the other terminal being connected to the like terminals of the other diodes in a common circuit so that carry pulses generated by said adder are applied to said common circuit and provide a level output indicative of carry propagation, and signal generating means for converting a transition in said level output to a pulse signal indicative of termination of carry propagation in said adder including a transistor having emitter, base, and collector electrodes, said transistor being connected in common emitter configuration, a pulse transformer connected to the collector electrode of said transistor, and means to apply said level output to the base electrode of said transistor so that a transition in said level output causes said transistor to change its state of conduction and causes said pulse transformer to produce a pulse signal indicative of the completion of a summing operation at that time.

References Cited in the file of this patent

UNITED STATES PATENTS

| | | |
|---|---|---|
| 2,445,215 | Flory | July 13, 1948 |
| 2,557,729 | Eckert | June 19, 1951 |
| 2,700,503 | Crosman | Jan. 25, 1955 |
| 2,712,065 | Elbourn et al. | June 28, 1955 |
| 2,890,829 | Logan | June 16, 1959 |
| 2,907,526 | Havens | Oct. 6, 1959 |